(12) United States Patent
Schwenkel et al.

(10) Patent No.: US 7,623,326 B2
(45) Date of Patent: Nov. 24, 2009

(54) METHOD AND DEVICE FOR SWITCHING OFF AN INDUCTIVE LOAD IN A FAILSAFE MANNER

(75) Inventors: Hans Schwenkel, Stuttgart (DE); Thomas Leitmann, Rechberghausen (DE); Mark Hufnagel, Wolfsschlugen (DE)

(73) Assignee: Pilz GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/417,321

(22) Filed: May 3, 2006

(65) Prior Publication Data

US 2006/0255786 A1 Nov. 16, 2006

Related U.S. Application Data

(63) Continuation of application No. PCT/EP2004/011234, filed on Oct. 8, 2004.

(30) Foreign Application Priority Data

Nov. 6, 2003 (DE) .................... 103 51 873

(51) Int. Cl.
*H02H 3/20* (2006.01)
(52) U.S. Cl. .......................... 361/23; 361/90
(58) Field of Classification Search ....... 361/93.7–93.9, 361/92, 23, 90, 91.6, 91.7
See application file for complete search history.

(56) References Cited

U.S. PATENT DOCUMENTS

| 4,599,675 | A | | 7/1986 | Fisher et al. |
|---|---|---|---|---|
| 4,733,326 | A | | 3/1988 | Harsch et al. |
| 4,763,222 | A | * | 8/1988 | Heaston et al. ............. 361/195 |
| 4,809,122 | A | * | 2/1989 | Fitzner ........................ 361/18 |
| 5,027,250 | A | * | 6/1991 | Cini et al. ..................... 361/90 |
| 5,404,262 | A | | 4/1995 | Enomoto et al. |
| 5,616,970 | A | * | 4/1997 | Dittrich ...................... 307/126 |
| 5,668,706 | A | | 9/1997 | Sakai et al. |
| 5,757,599 | A | * | 5/1998 | Crane .......................... 361/56 |
| RE36,046 | E | | 1/1999 | Brambilla et al. |
| 5,945,868 | A | * | 8/1999 | Robb et al. .................. 327/482 |
| 6,160,691 | A | * | 12/2000 | Shen et al. .................... 361/79 |
| 6,486,644 | B1 | * | 11/2002 | Nemirow .................... 323/285 |
| 6,493,204 | B1 | | 12/2002 | Glidden et al. |
| 6,891,708 | B2 | * | 5/2005 | Hutamura et al. ........... 361/100 |
| 7,054,123 | B2 | * | 5/2006 | Ausserlechner et al. ....... 361/90 |

FOREIGN PATENT DOCUMENTS

| DE | 35 17 490 A1 | 11/1986 |
|---|---|---|
| DE | 199 33 201 A1 | 1/2001 |
| EP | 0 429 406 A1 | 5/1991 |
| WO | WO 01/06162 A2 | 1/2001 |

* cited by examiner

*Primary Examiner*—Danny Nguyen
(74) *Attorney, Agent, or Firm*—Harness, Dickey & Pierce, P.L.C.

(57) ABSTRACT

A method and a device for switching off an inductive load in a failsafe manner are proposed. According to one aspect of the invention, the method and the device are configured such that a predefined inductive voltage is generated during switch-off. The predefined inductive voltage is monitored by means of a monitoring circuit. In a preferred embodiment, the inductive voltage is set by means of threshold switches and the inductive voltage also is monitored by means of these threshold switches.

14 Claims, 1 Drawing Sheet

METHOD AND DEVICE FOR SWITCHING OFF AN INDUCTIVE LOAD IN A FAILSAFE MANNER

CROSSREFERENCES TO RELATED APPLICATIONS

This application is a continuation of international patent application PCT/EP2004/011234, filed on Oct. 8, 2004 and published in German language, which claims priority from German patent application DE 103 51 873.8, filed on Nov. 6, 2003.

BACKGROUND OF THE INVENTION

The present invention relates to a safety switching device and method for fail-safely switching off an inductive load, such as a conductor or, in particular, a magnetic valve in a hydraulic press.

Typical prior art safety switching devices are used for switching-off a technical installation, such as an hydraulic press or an automated conveyor system in the event of a hazardous situation, wherein "reliably" means "in a failsafe manner". For this purpose, inputs of the prior art safety switching devices are connected to signaling devices, such as emergency-off buttons, light barriers, protective doors, rotational speed sensors and others. The safety switching devices evaluate the signals of these signaling devices in a predetermined failsafe manner and, if necessary, they generate a switching signal at their own output, which switching signal, for example, is used to slow down or stop the drive of a monitored system. As a result, a safe state is achieved in a fail-safe manner.

Since health or even the life of operators and others are placed at risk in the case of a failure of the safety switching device, numerous special regulations have to be observed in the development, production and operation of safety switching devices. Accordingly, the present invention is directed to safety switching devices which particularly comply with categories 3 or 4 of the pertinent European Standard EN 954-1 or comparable safety requirements. Within this framework, however, the invention is not restricted to the above-mentioned special examples.

To meet the high requirements for intrinsic fail-safety, typical prior art safety switching devices are often redundantly constructed and/or continuously perform internal functional checks. It is clear, therefore, that the development and production of typical safety switching devices requires considerable effort in comparison with "normal" switching devices. On the other hand, for cost reasons, this increased effort is only made where it is necessary in order to achieve the required fail-safety. For this reason, prior art safety switching devices can contain components and/or parts which by themselves do not have the fail-safety otherwise required.

Prior art safety switching devices are often used for switching off inductive loads, such as contactors or magnetic valves. It is well known that the current flows through such loads cannot be abruptly interrupted due to their inductance. At the instant of switching off, i.e. when one or more switching elements of the safety switching device interrupt the current path to the inductive load, an inductive voltage is produced, the magnitude of which can considerably exceed the operating voltage present at the load under normal operating conditions. It is also known to limit such an inductive voltage by means of suitable threshold switches, such as Zener diodes. Limiting the inductive voltage helps to prevent damage at the output circuit of the safety switching device and at the load to be switched off. Since, on the other hand, the afore-mentioned threshold switches do not have a direct influence on the safety function of the prior art switching devices, it has hitherto not been necessary to provide functional safety measures at this place.

In general, it is desirable to switch off a monitored system as fast as possible when a hazardous situation occurs. This particularly applies to the monitoring of presses since the punch moving down represents a great hazard for the operating personnel, on the one hand, and the operating personnel has to work in close vicinity of the punch on the other.

SUMMARY OF THE INVENTION

In view of this background, it is an object of the present invention to provide a safety switching device which allows for rapid and failsafe switching off of an inductive load. It is another object to provide such a safety switching device that can be implemented in a simple and thus inexpensive manner.

According to an aspect of the present invention, there is provided a safety switching device comprising a signal processing section for receiving and evaluating an input-sided switching-off signal, at least one first switching element, activated by the signal processing section, for switching off the load, a first threshold switch for setting a predefined inductive voltage at the load during the switching-off, and a monitoring circuit for monitoring the threshold switch.

According to another aspect, there is provided a method comprising the steps of receiving and evaluating an input-sided switch-off request signal, activating a first switching element for switching off the load, providing a first threshold switch for setting a predefined inductive voltage at the load during activation of the first switching element for switching off the load, and monitoring the predefined inductive voltage by means of a monitoring circuit.

For the first time in the field of safety switching devices of the type mentioned above, it is suggested to monitor the function of the threshold switch used, and thus to monitor the magnitude of the inductive voltage occurring during switch-off. The higher the inductive voltage is, the more rapidly the energy stored in the inductive load can be removed and the more rapidly a desired switching-off process is actually ended. In other words, a rapid switching-off process can be achieved by the output circuit of the safety switching device being designed such that the inductive voltage-does not drop below a certain threshold voltage when the load is being switched off. If it is desired to take benefit from a high switching-off rate by reducing, for example, safety margins otherwise required, the magnitude of the inductive voltage becomes a safety-critical variable. It is then desirable to monitor the magnitude of the inductive voltage in order to ensure that the load is timely switched off in all operating situations. As a result, the threshold switch, which has hitherto not been used for the safety function, also becomes a safety-critical component of the switching device.

Monitoring the inductive voltage or the associated threshold switch makes it possible to guarantee the discharge time of the inductive load on switch-off within a time window that can be determined. This time window can be minimized by appropriately dimensioning the threshold switch (and possibly the other components used in the output circuit of the safety switching device). The novel safety switching device thus provides for more rapid and at the same time reliable switching-off.

Due to the invention, it is generally possible to prevent damage to the safety switching device resulting from the occurrence of too high inductive voltages, or corresponding damage and associated functional failures can be detected more rapidly and more reliably. The novel safety switching device, therefore, provides an even greater safety margin.

In a preferred refinement of the invention, an error signal is generated when the inductive voltage drops below a threshold value.

In this refinement, an operational error which might impair the switching-off rate of the novel safety switching device is reported early so that, if necessary, a warning signal can be generated and/or the monitored system can be brought into a safe position of rest as a precaution. This refinement, therefore, represents an advantageous development of the basic concept described above.

In a further refinement, the inductive voltage is divided into at least two inductive partial voltages and a divider ratio of the inductive partial voltage is monitored.

In principle, the inductive voltage can be measured by means of picking up an appropriate measurement-value and then comparing the measurement-value with a predefined reference value. With such an approach, however, the reference value is also safety-critical since a faulty reference value could have the consequence that the inductive voltage undetected drops below the selected minimum value. The preferred refinement, therefore, does not monitor the inductive voltage by means of an absolute measurement value but by comparing inductive partial voltages relative to each other. This preferred embodiment can be implemented in a less expensive manner. In this refinement, use is made of the fact that the actual magnitude of the inductive voltage is determined by the manufacturer of the safety switching device due to the selection of the threshold switch or switches used. To monitor the inductive voltage, it is then sufficient to ensure that no changes occur in operation with respect to the values set by the manufacturer. This is advantageously achieved here by comparing variables set by the manufacturer relative to one another, such as by comparing two inductive partial voltages in this case. In an even more preferred case, the inductive voltage is divided in half so that the monitoring is effected by means of a comparison of symmetry. In general, however, other divider ratios are also possible.

In a further refinement, the new safety switching device has a second threshold switch for setting the inductive voltage, the first and the second threshold switches being arranged in such a manner that the magnitude of the inductive voltage is influenced by each of these threshold switches. In a particularly preferred embodiment, the at least two threshold switches are arranged in series with one another so that the magnitude of the inductive voltage must change when one threshold switch fails. It is also preferred in this arrangement that the minimum inductive voltage guaranteed by the manufacturer is already be maintained by one threshold switch alone since this provides for redundancy and increased fail-safety. In addition, this refinement can be implemented in a very simple manner since the two threshold switches by themselves already generate inductive partial voltages.

In a further refinement, the first and the second threshold switches are arranged in series with one another, a tap for a monitoring voltage being arranged between the two threshold switches.

This refinement is an advantageous improvement of the basic concept of monitoring the inductive voltage by comparing inductive partial voltages. Picking up the monitoring voltage between the series-connected threshold switches is a very simple implementation. In principle, however, a monitoring voltage picked up between the threshold switches can also be monitored for its absolute magnitude, this refinement having the general advantage that simpler and thus more inexpensive measuring elements can be used which do not necessarily need to be high-voltage-resistant.

In a further refinement, the tap defines a first voltage divider having a first divider ratio and there is also provided a second voltage divider having a second divider ratio which corresponds to the first divider ratio.

This refinement is another improvement of the basic concept of monitoring the inductive voltage in a relative manner rather than with regard to absolute values. Using the second voltage divider which preferably divides the operating voltage existing in the safety switching device in a fixed ratio, a reference value for the monitoring can be generated in a very simple manner. The first voltage divider, in contrast, divides the inductive voltage produced and the first voltage divider can also contain other components in addition to the two threshold switches. By comparing the mutually corresponding partial voltages of the two voltage dividers, the preset inductive voltage is monitored in a very efficient and effective manner.

In a further refinement, the second voltage divider is arranged in parallel with the first voltage divider.

This refinement simplifies the circuit configuration even more since the partial voltages to be compared with one another can be supplied simply to a comparison circuit.

In a further refinement, the novel safety switching device has two terminals for connecting the load, the terminals being arranged in such a manner that the load is located in parallel with the above-mentioned tap.

This refinement also facilitates a simple implementation since, as a result, the inductive voltage produced is directly distributed to the two branches which are compared with one another for the monitoring. The number of required components is further reduced.

In a further refinement, the novel safety switching device has a second switching element activated by the signal processing part, the first switching element being arranged upstream and the second switching element being arranged downstream of the load.

This refinement further continues the concept of monitoring the inductive voltage by comparing—preferably balanced or symmetrical—partial voltages. Implementation is even more simplified.

In a further refinement, the monitoring circuit comprises an optocoupler having a transmitting element and a receiving element, the transmitting element being connected to a signal depending on the inductive voltage at a first terminal and to a reference signal at a second terminal.

In this refinement, the inductive voltage or a monitoring signal derived therefrom is compared with a reference signal by means of an optocoupler. Usually, comparator circuits using operational amplifiers or conventional differential amplifiers have hitherto been used for such purposes. In contrast, use of an optocoupler has the advantage that the feedback circuit already provides for a DC-isolation which contributes to increased safety. This refinement, therefore, contributes to a reduction of the components needed.

In a further refinement, the threshold switch is arranged in parallel with the switching element.

As an alternative, the threshold switch could basically also be arranged at another place, for example in parallel with the load. However, the preferred embodiment allows a very simple implementation of the concept of monitoring the inductive voltage by means of a relative comparison of partial voltages.

In a further refinement, the threshold switch comprises at least two threshold switching elements, preferably Zener diodes, arranged in series with one another.

In this embodiment, the one threshold switch is redundant per se. This provides for increased fail-safety. In particular, it is possible to ensure a desired minimum inductive voltage even if one of the threshold switching elements fails. In addition, this refinement has the advantage that threshold switches with low power values, and thus lower tolerances, can be used which contributes to a further reduction in production costs.

In a further refinement, the switching element comprises at least two transistors arranged in series with one another, preferably MOS transistors.

This refinement is particularly advantageous in combination with the two afore-mentioned refinements, i.e. when a number of threshold switching elements are arranged in parallel with a number of transistors. The advantage is that, by using a number of transistors, a premature breakdown of the pn junctions present in the individual transistors is prevented without needing transistors which are particularly high-voltage-resistant. In addition, this refinement provides further redundancy which is a benefit for fail-safety. The two transistors arranged in series with one another are preferably diversity, i.e. from different manufactures and/or of different type of construction which reduces the risk of simultaneous failure even further.

It goes without saying that the above-mentioned features and those still to be explained in the following can be used not only in the specified combination but also in other combinations or by themselves without departing from the scope of the present invention.

DESCRIPTION OF PREFERRED EMBODIMENTS

Figure 1:
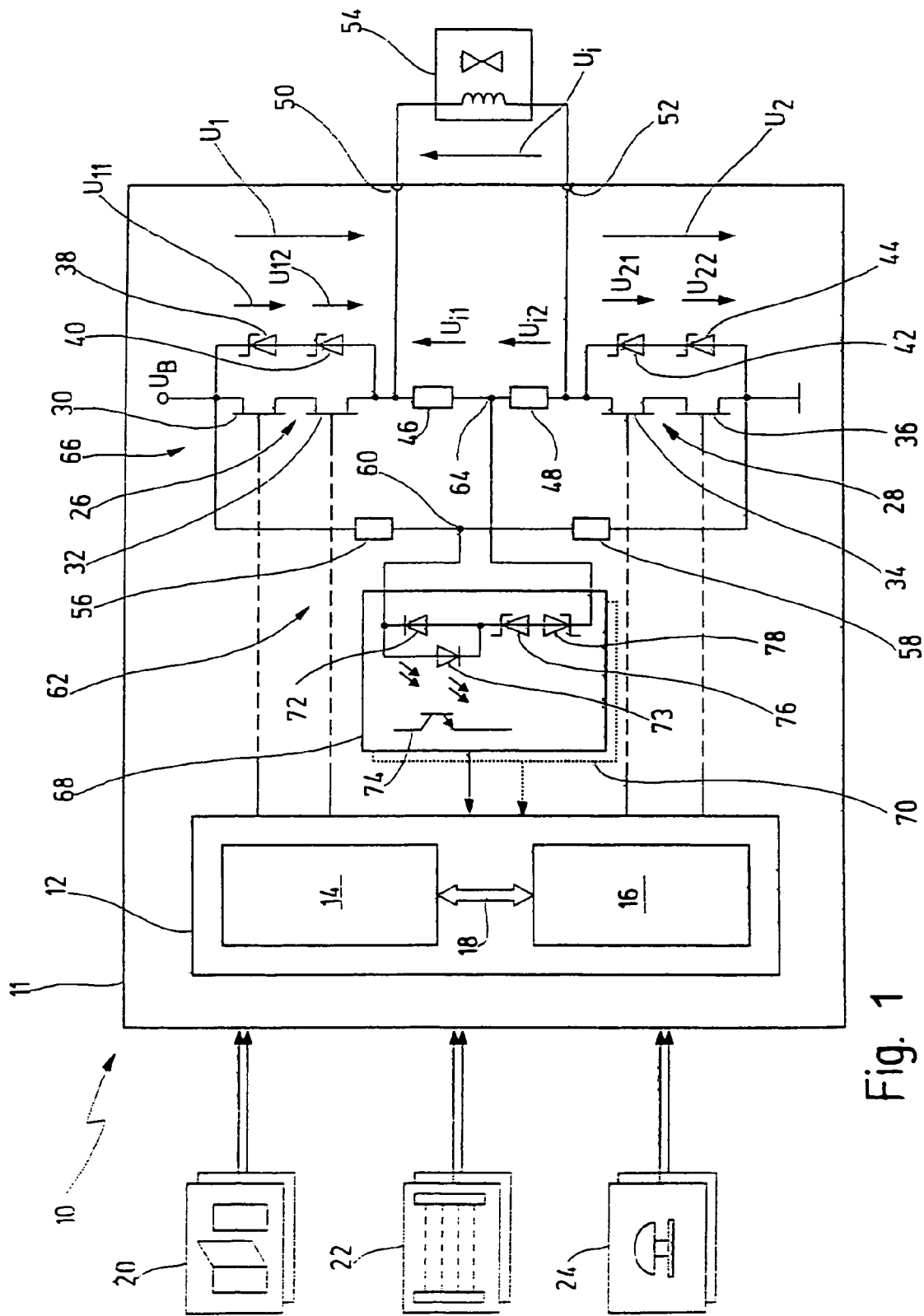
FIG. 1 is a schematic diagram of a preferred embodiment of the present invention.

Referring to FIG. 1, an exemplary embodiment of the entire novel safety switching device is designated by the reference number 10. The safety switching device 10 is here, by way of example, an autonomously operable safety switching device in which all functional elements are compactly built into a device housing 11. As an alternative, however, this could also be a circuit board of a complex safety controller, especially of a PLC (programmable logic controller) designed for safety purposes. In a further exemplary embodiment (not shown here), the safety switching device 10 could be constructed with spatially distributed components which are connected to one another, for example, via a bus system.

The safety switching device 10 has a signal processing section 12. The signal processing section 12 is constructed here with several channels according to the intended use and the associated safety requirements. In a simplified manner, therefore, the signal processing section 12 is shown with two microprocessors 14, 16 which communicate with one another and monitor one another which is represented by an arrow 18.

At the input end, signaling devices for safety purposes can be connected to the safety switching device 10. For example, but not in a limiting way, protective doors 20, light barriers 22 and emergency-off buttons 24 are shown here. The signal processing section 12 evaluates the signals of these signaling devices in a failsafe manner known per se, and it activates one or more switching elements at the output in dependence thereon.

In the present case, the safety switching device 10 has two switching elements 26, 28 at the output which in each case contain two MOS transistors arranged in series with one another. The transistors are here designated by the reference numbers 30, 32, 34 and 36 and they are connected in series with one another between an operating voltage $U_B$ and ground. Each of the four MOS transistors 30, 32, 34, 36 can be activated by the signal processing section 12 via a corresponding connection.

Two Zener diodes 38, 40 are arranged in series with one another and in parallel with the two transistors 30, 32. The Zener diodes 38, 40 together form a first threshold switch in terms of the present invention.

The transistors 34, 36 together form the second switching element. Two further Zener diodes 42, 44 are arranged in series with one another and in parallel with the second switching element. The Zener diodes 42, 44 are a second threshold switch in terms of the present invention.

Using MOS transistors 30 to 36 and Zener diodes 38 to 44 is a currently preferred embodiment. In deviation, however, other components can also be used, for example bipolar transistors for the switching elements or conventional diodes or thyristors as threshold switching elements. In addition, use of two transistors and two Zener diodes in each case, as shown here, is a preferred variant. In deviation, however, other elements or only one transistor and one Zener diode can also be used.

Two resistors 46, 48 are arranged in series between the first switching element 26 and the second switching element 28. Overall, this results in a series circuit of transistors 30, 32, resistors 46, 48 and transistors 34, 36 arranged between operating voltage $U_B$ and ground. The Zener diodes 38, 40 are located in parallel with the transistors 30, 32 and the Zener diodes 42, 44 are located in parallel with the transistors 34, 36.

At a first junction between transistor 32 and resistor 46, a tap is located which is brought to a terminal 50 of the safety switching device 10. Likewise, a second tap is located between transistor 34 and resistor 48. The second tap is brought to a terminal 52. When the safety switching device 10 is in operation, a load is connected to terminals 50, 52 which in this case is shown as a magnetic valve 54 by way of example. Such a connection of the load 54 is usually called a two-pole connection in this field of the art. A two-pole connection represents the preferred application for the present invention. In principle, however, the invention can also be applied with single-pole output connections.

In parallel with the series circuit of the transistors 30 to 36 and the resistors 46, 48, there is a series circuit of two resistors 56, 58. Between the two resistors 56, 58, there is a tap 60 so that the resistors 56, 58 form a voltage divider which is here designated by reference number 62. Like the series circuit of the transistors 30 to 36 and the resistors 46, 48, the voltage divider 62 is arranged between operating voltage $U_B$ and ground.

A further tap which is arranged between the two resistors 46, 48 is here designated by the reference number 64. Tap 64 divides the series circuit of the transistors 30, 32, 34, 36 and the resistors 46, 48 in the center so that a second voltage divider 66 is formed. The divider ratios of the first voltage divider 62 and of the second voltage divider 66 are preferably of the same magnitude. It is also preferred that the divider ratios are here in each case 0.5, i.e. that in normal operation, a voltage of the magnitude of $U_B/2$ is present at each of the taps 60, 64. In principle, however, different divider ratios are also possible.

Reference numbers 68 and 70 designate two optocouplers, optocoupler 70 operating here redundantly with respect to optocoupler 68 and may also be omitted. Optocoupler 68 in this case has two transmitting elements 72, 73, which are connected in an antiparallel manner to one another, and a receiving element 74. The transmitting elements 72, 73, typically LEDs, are connected to tap 60 at one terminal and to a series circuit of two Zener diodes 76, 78 at a second terminal. The two Zener diodes 76, 78 are rotated with respect to one another so that in each case only one operates in the direction of conduction and the other one in the non-conducting direction. The open end of the series circuit of the two Zener diodes 76, 78 is connected to tap 64. Zener diodes 76, 78 ensure that the transmitting elements 72, 73 only generate a transmit signal above a defined switching threshold. Such a transmit signal then leads to a feedback signal to the signal processing section 12. The two transmitting elements 72, 73 connected in antiparallel manner provide for some sort of absolute-value formation since the difference voltage between the taps 60 and 64 can be negative or positive. Depending on this, only one transmitting element 72, 73 in each case responds here. As an alternative, this absolute-value formation can also be achieved by means of two optocouplers 68, 70 arranged in antiparallel manner, in which only one transmitting element 72 is used in each case then.

The safety switching device 10 shown operates as follows:

In steady-state operation, that is to say, when the magnetic valve 54 carries current, a voltage which approximately corresponds to the operating voltage $U_B$ is present across the magnetic valve 54. The operating voltage $U_B$ is divided in half via the two voltage dividers 62, 66 and the partial voltages produced are supplied to the optocouplers 68, 70 at taps 60, 64. Since the voltages at taps 60, 64 are virtually of the same magnitude (apart from some slight tolerances), there is no voltage present at the transmitting element 72 and the receiving element 74 accordingly does not receive a transmit signal.

If the signal processing section 12 then wishes to switch off the load 54 (or wishes to perform a switching-off test), it activates the transistors 30 to 36 in such a manner that the current path to the load 54 is interrupted. In other words, the signal processing section 12 opens transistors 30 to 36. Due to the interruption of the current path, an inductive voltage $U_i$ is produced across the load 54. The inductive voltage $U_i$ is limited by the Zener diodes 38 to 44. In other words, the magnitude of the inductive voltage $U_i$ is set by the dimensioning of the Zener diodes 38 to 44.

The following relationships then apply to the voltages in the output circuit of the safety switching device 10 (with a divider ratio of 0.5 of the voltage dividers 62, 66):

$$U_i = U_1 + U_2 - U_B \text{ and}$$

$$U_{i1} = U_{i2} = U_i/2,$$

Where $U_1$ is the voltage across the first switching element 26,
$U_2$ is the voltage across the second switching element 28,
$U_i$ is the inductive voltage across the load 54,
$U_{i1}$ is the voltage across the resistor 46,
$U_{i2}$ is the voltage across the resistor 48 and
$U_B$ is the operating voltage.

The voltage at tap 64 is then:

$$U_{64} = U_2 - U_{i2} = \frac{U_i + U_B}{2} - \frac{U_i}{2} = \frac{U_B}{2}$$

In other words, the voltage at tap 64 remains virtually unchanged even when the load 54 is switched off, as long as the partial voltages $U_{i1}$ and $U_{i2}$ or the partial voltages $U_1$ and $U_2$, are of equal magnitude in each case. If one of the Zener diodes 40 to 44 were to be defective, this assumption no longer holds. The voltage divider 66 would divide the inductive voltage occurring nonuniformly which leads to the potentials at taps 60 and 64 differing from one another. The consequence would be that a voltage would be applied to the transmitting element 72 which leads to a transmit signal of the optocoupler 68, 70.

According to a preferred exemplary embodiment, the Zener diodes 38 to 44 are dimensioned here in such a manner that a minimum inductive voltage of $U_i$=100 V is achieved even if one of the Zener diodes becomes defective.

What is claimed is:

1. A safety switching device for switching off an inductive load in a failsafe manner, the device comprising:
    a signal processing section for receiving and evaluating an input-sided switching-off signal,
    at least one first switching element, activated by the signal processing section, for switching off the load,
    a first threshold switch for limiting an inductive voltage to a predefined inductive voltage at the load during the switching-off,
    a monitoring circuit for monitoring the threshold switch,
    wherein the monitoring circuit is configured to generate an error signal when the inductive voltage drops below a threshold value, and
    at least one second threshold switch for limiting the inductive voltage to the predefined inductive voltage, the first and second threshold switches being arranged in such a manner that the magnitude of the inductive voltage is influenced by each of the threshold switches.

2. The device of claim 1, wherein the first and the second threshold switches are arranged in series with one another, with a tap for a monitoring signal being arranged between the two threshold switches.

3. The device of claim 2, wherein the tap defines a first voltage divider having a first divider ratio.

4. The device of claim 3, further comprising a second voltage divider having a second divider ratio, corresponding to the first divider ratio.

5. The device of claim 4, wherein the second voltage divider is arranged in parallel with the first voltage divider.

6. The device of claim 2, further comprising two terminals for connecting the load, the terminals being arranged in such a manner that the load is positioned in parallel with the tap.

7. The device of claim 1, further comprising a second switching element activated by the signal processing section, the first switching element being arranged upstream and the second switching element being arranged downstream of the load.

8. The device of claim 1, wherein the monitoring circuit comprises an optocoupler having a transmitting element and a receiving element, with the transmitting element having a first and a second terminal, and wherein the first terminal is connected to a signal that is dependent on the inductive voltage, and the second terminal is connected to a defined reference signal.

9. The device of claim 1, wherein the threshold switch is arranged in parallel with the switching element.

10. The device of claim 1, wherein the threshold switch comprises at least two threshold switching elements arranged in series with one another.

11. The device of claim 10, wherein the threshold switching elements are Zener diodes.

12. The device of claim 1, wherein the switching element comprises at least two transistors arranged in series with one another.

13. The device of claim 1, wherein the inductive load is a magnetic valve or a conductor.

14. A method for switching off an inductive load in a failsafe manner, the method comprising the steps of:

receiving and evaluating an input-sided switch-off request signal, activating a first switching element for switching off the load, providing a first threshold switch for limiting an inductive voltage to a predefined inductive voltage at the load during activation of the first switching element for switching off the load, monitoring the predefined inductive voltage by means of a monitoring circuit, wherein an error signal is generated when the inductive voltage drops below a threshold value, and further wherein the inductive voltages is divided into at least two inductive partial voltages, wherein a divider ratio of the at least two inductive partial voltages is monitored.

* * * * *